W. W. SCOTT.
STRIP CUTTING AND SEWING MECHANISM.
APPLICATION FILED DEC. 22, 1917.

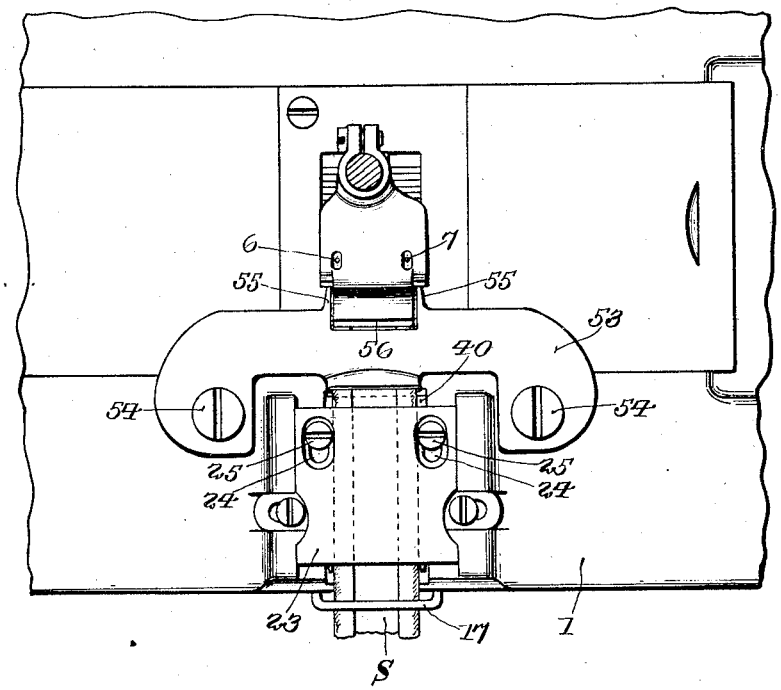
Fig. 4.
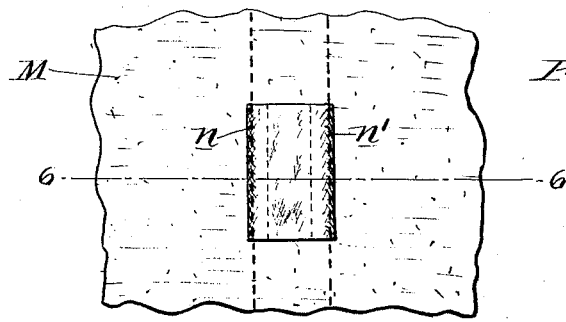
Fig. 5.
Fig. 6.

1,365,282.

Patented Jan. 11, 1921.
9 SHEETS—SHEET 5.

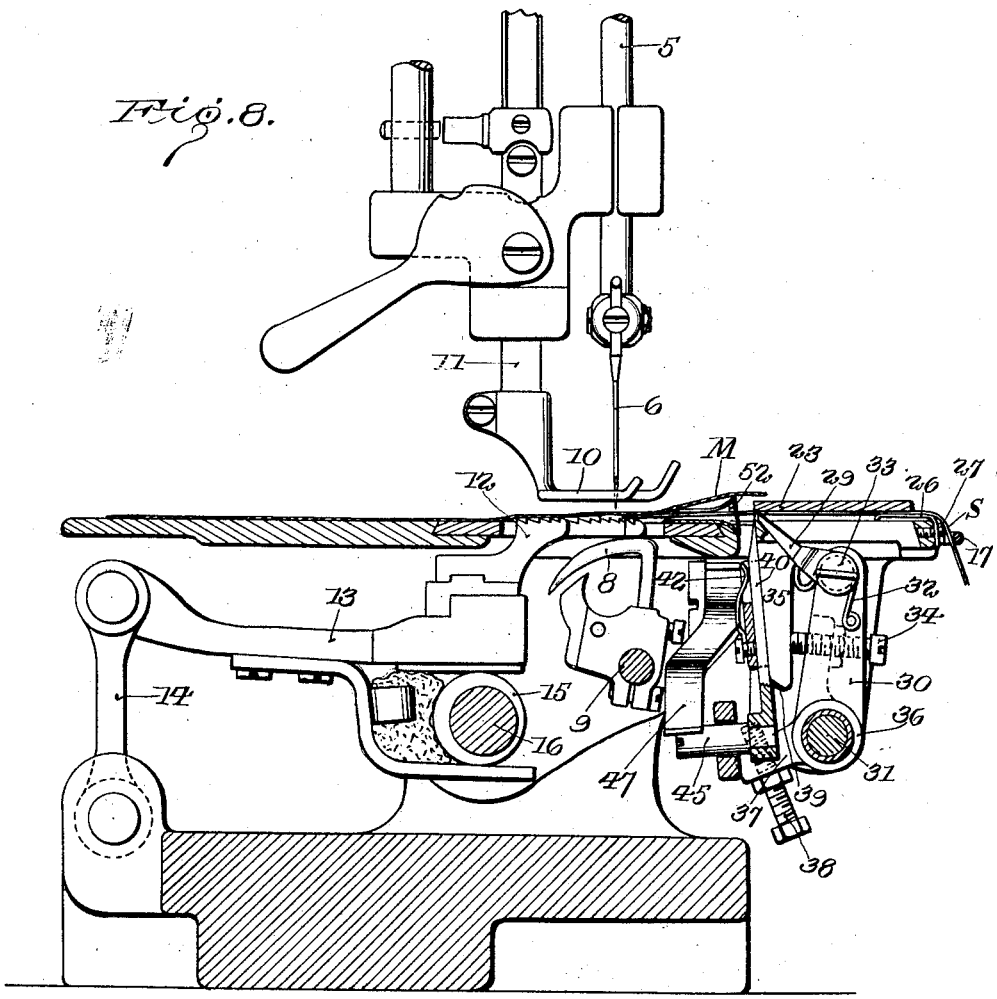

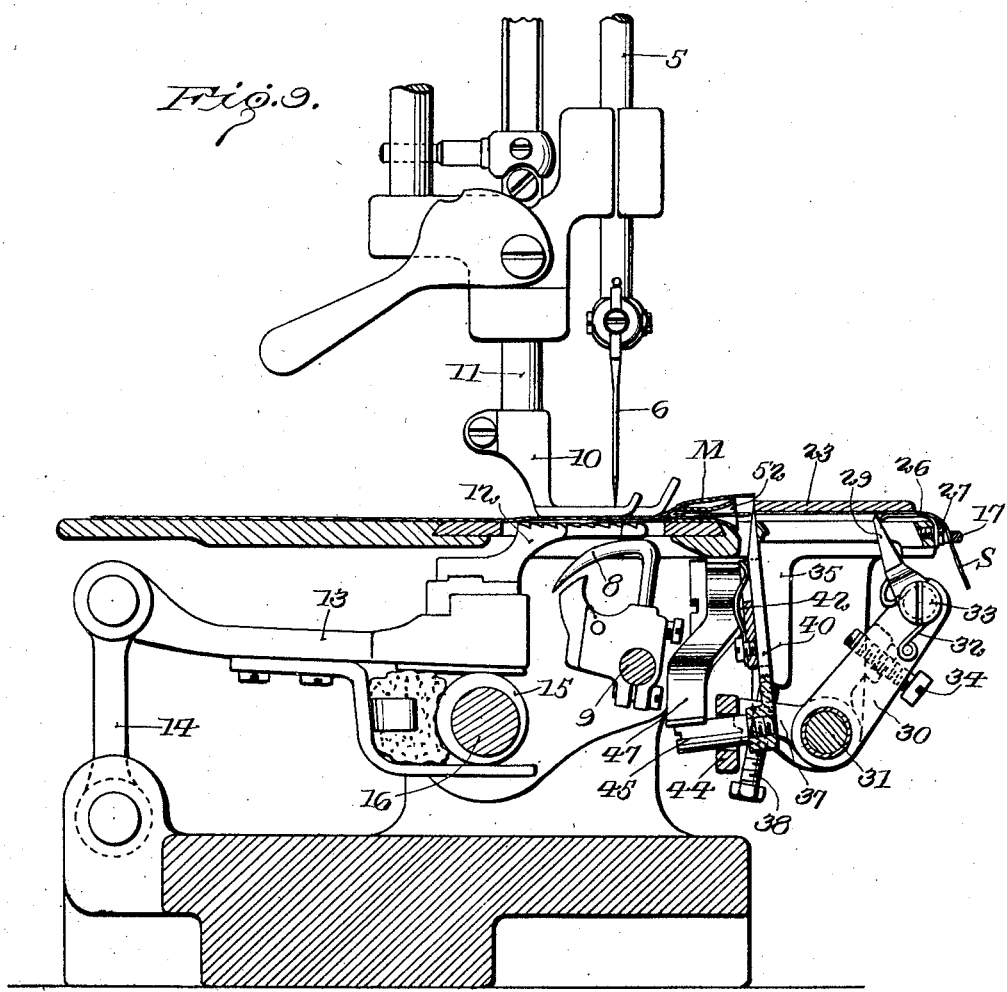

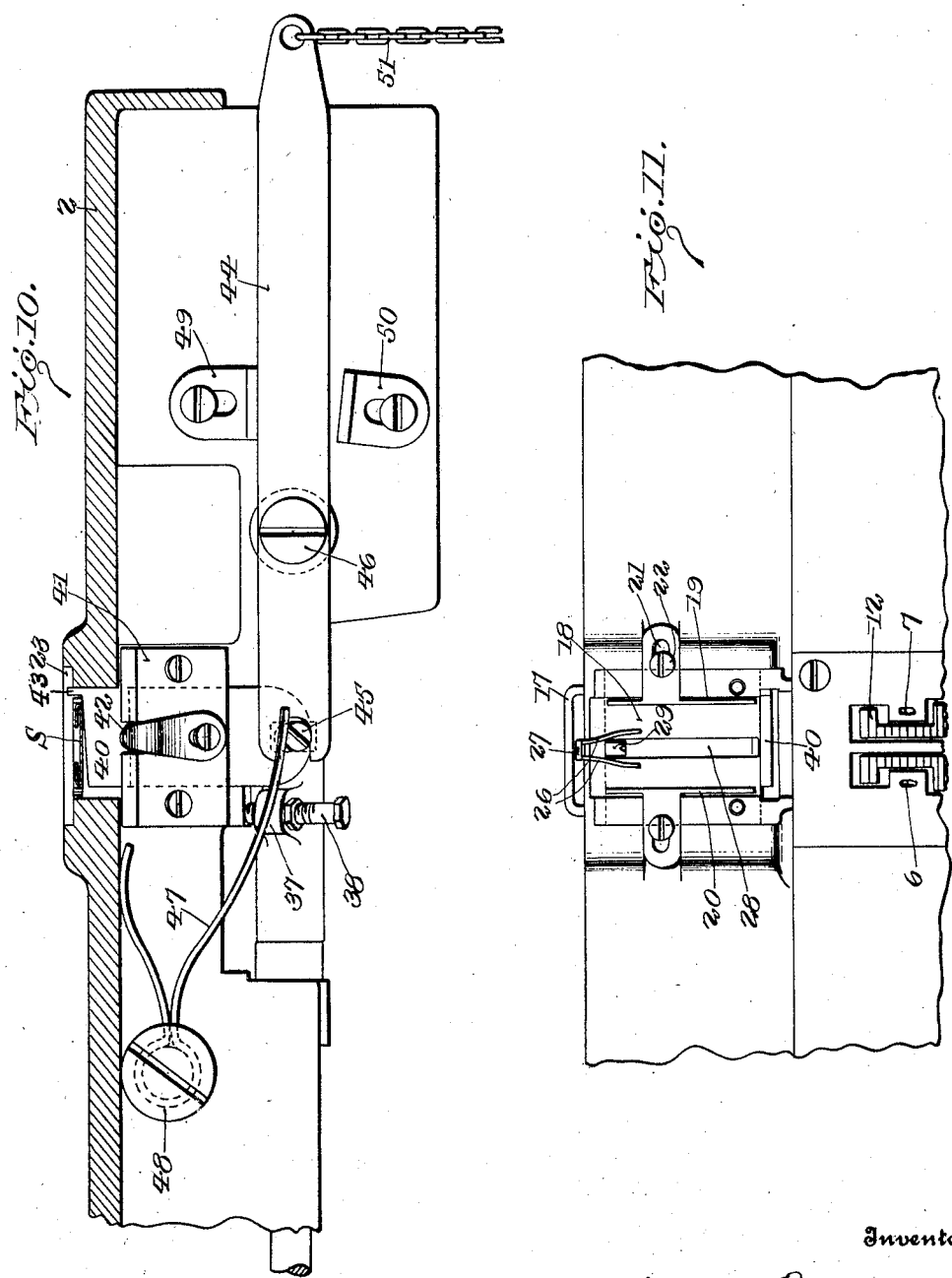

W. W. SCOTT.
STRIP CUTTING AND SEWING MECHANISM.
APPLICATION FILED DEC. 22, 1917.
1,365,282.
Patented Jan. 11, 1921.
9 SHEETS—SHEET 9.
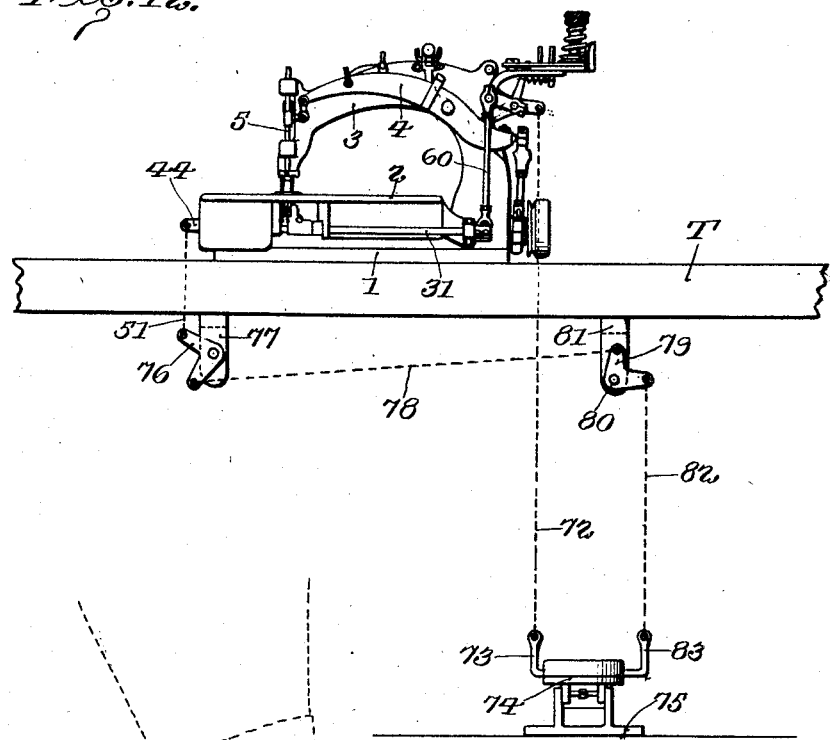
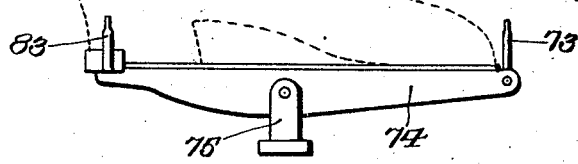

UNITED STATES PATENT OFFICE.

WALTER W. SCOTT, OF AMSTERDAM, NEW YORK, ASSIGNOR TO UNION SPECIAL MACHINE COMPANY, OF CHICAGO, ILLINOIS, A CORPORATION OF ILLINOIS.

STRIP CUTTING AND SEWING MECHANISM.

1,365,282.  Specification of Letters Patent.  Patented Jan. 11, 1921.

Application filed December 22, 1917. Serial No. 208,387.

*To all whom it may concern:*

Be it known that I, WALTER W. SCOTT, a citizen of the United States, residing at Amsterdam, in the county of Montgomery, State of New York, have invented certain new and useful Improvements in Strip Cutting and Sewing Mechanism, of which the following is a description, reference being had to the accompanying drawing and to the figures of reference marked thereon.

The invention relates to new and useful improvements in strip cutting and sewing mechanisms and more particularly to a machine of the above type which may be used for stitching labels or short strips of any character to a body material.

An object of the invention is to provide means for cutting the strip, which is manually controlled, and also means for lifting the presser foot and feeding the free end of the remaining strip underneath the presser foot so that it will be caught by the feeding mechanism and fed to the stitching mechanism which feeding in means is capable of being operated independently of the cutting means.

A further object of the invention is to provide a machine of the above character wherein the cutting means and the feeding in means for the strip may be operated independently from a single treadle.

These and other objects will in part be obvious and will in part be hereinafter more fully disclosed.

In the drawings, which show by way of illustration, one embodiment of the invention,—

Fig. 4 is an enlarged plan view of the presser foot, a portion of the work support and the parts directly in front of the presser foot;

Fig. 5 is a detail showing a body material with a strip attached thereto, with my improved machine;

Fig. 6 is a sectional view on the line 6—6 of Fig. 5;

Fig. 8 is a similar view but showing the feeding in finger moved to the forward end of its stroke and the strip to be cut fed forward underneath the presser foot;

Fig. 9 is a view similar to Fig. 8, but showing the feeding in finger at the rear end of its stroke and the knife raised for severing the strip;

Fig. 10 is a vertical section at right angles to the line of feed and directly in front of the severing knife showing the cutting mechanism in rear view;

Fig. 11 is a detail of the work support showing the throat plate, feed dog and the parts directly in front thereof with the cover plate and upper ledger blade removed;

Fig. 12 is a view showing a sewing machine in position on a bench and the connection between the feeding in means and the severing device and the treadle which controls the same; and Fig. 13 is an enlarged detail of the treadle showing the position of the operator's foot.

Figure 1:
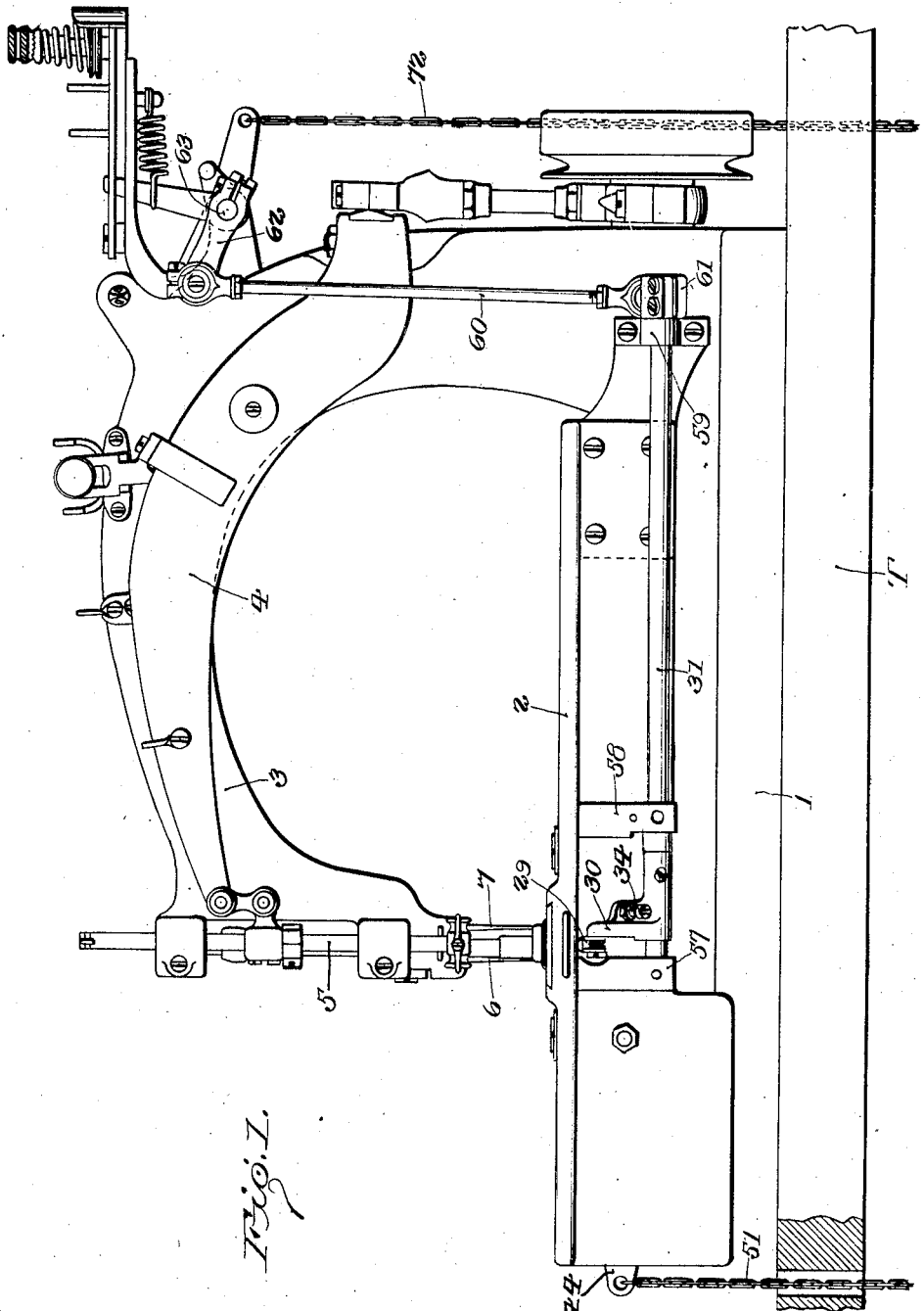
Figure 1 is a front view of a sewing machine having my improvements applied thereto.

The invention consists broadly in a sewing machine having a stitching mechanism consisting preferably of two spaced needles and coöperating devices which form two independent lines of stitching. Directly in front of the presser foot is a guide for guiding a strip of material to the stitching mechanism. Associated with the guiding means is a cutting blade which may be actuated at the will of the operator for severing the strip. Also associated with the guide and severing means is a feeding in finger which engages the free end of the remaining portion of the strip and feeds the same forward underneath the presser foot. The means for operating the feeding in finger is independent of the means for operating the severing mechanism. The means for operating the feeding in finger includes devices which first raise the presser foot slightly from the material and then feed the strip forward underneath the presser foot so that when the presser foot is released the strip will be clamped between the foot and the feed dog and fed to the stitching mechanism. The severing device and the feeding in finger are preferably controlled by a single treadle, one of the devices being attached to the toe end of the treadle while the other is attached to the heel end of the treadle. The tilting of the treadle in one direction operates one device but not the other, while the tilting of the treadle in the other direction operates the other device and not the first named device.

Referring more in detail to the drawings, I have shown my invention applied to a sewing machine which includes a bed plate 1, carrying a work support 2. Rising from the bed plate is an overhanging arm 3 on which is pivoted a needle lever 4. The needle lever reciprocates a needle bar 5 at the forward end of the overhanging arm. Mounted on the needle bar are two needles 6 and 7. Coöperating with each needle beneath the work support is a looper 8 mounted on a looper support 9. The needles and their respective loopers form independent lines of stitching. The material is held on the work support by a presser foot 10 which is carried by a presser bar 11. Coöperating with the presser foot beneath the work support is a feed dog 12 which is mounted on a feed bar 13 pivoted at its rear end to a feed rocker 14. The feed bar is raised and lowered by an eccentric 15 on the main shaft 16. Said feed rocker is moved back and forth by suitable connections with the main shaft 16. The above parts form no part of the present invention except that they are the embodiment of a stitch forming mechanism forming a line or lines of stitching for securing the short strips to the body material.

In Figs. 5 and 6 of the drawings, I have shown the body material indicated at M to which a strip, indicated at S is attached by lines of stitching $n$ and $n'$. The edges of the strip S are turned in, as clearly shown in Fig. 6. The strip to be attached to a body material is led from a suitable supply through a guiding loop 17 attached to the front end of the work support 1. The work support 1 is provided with a recess 18 in its upper face, as clearly shown in Fig. 11 of the drawings. The strip passes through this recess and guides 19 and 20 adjustably attached to the cloth plate direct the strip so that it will be fed properly to the needles of the stitching mechanism. Each guide has an arm formed with a slot 21 and a screw 22 passing through the slot holds the guide in adjusted positions. The recess 18 is covered by a cover plate 23, which is provided with slots 24—24 and screws 25—25, passing through these slots secure the cover plate in place. These slots 24 are elongated in the direction of the line of feed of the machine so that the cover plate may be adjusted. This cover plate is hardened and forms the ledger blade of the severing mechanism and the adjustment of the covering plate is to permit the same to be brought into proper coöperative position relative to the movable blade of the severing mechanism, which will be hereinafter more fully described.

The strip passing through the guiding recess 18 is placed under very slight tension by spring fingers 26. These fingers are attached to the cloth plate by a screw 27 and extend into the recess and operate to press lightly against the strip so as to put the same under slight tension and thus prevent the weight of the strip from withdrawing the severed end from the recess. The cloth plate is slotted at 28 substantially from end to end of the recess 18. Extending up into the slot is a feeding in finger 29. This feeding in finger engages the under face of the strip and when moved forward will carry the strip forward therewith. When, however, the finger moves rearwardly it will slide along the strip.

Figure 7:
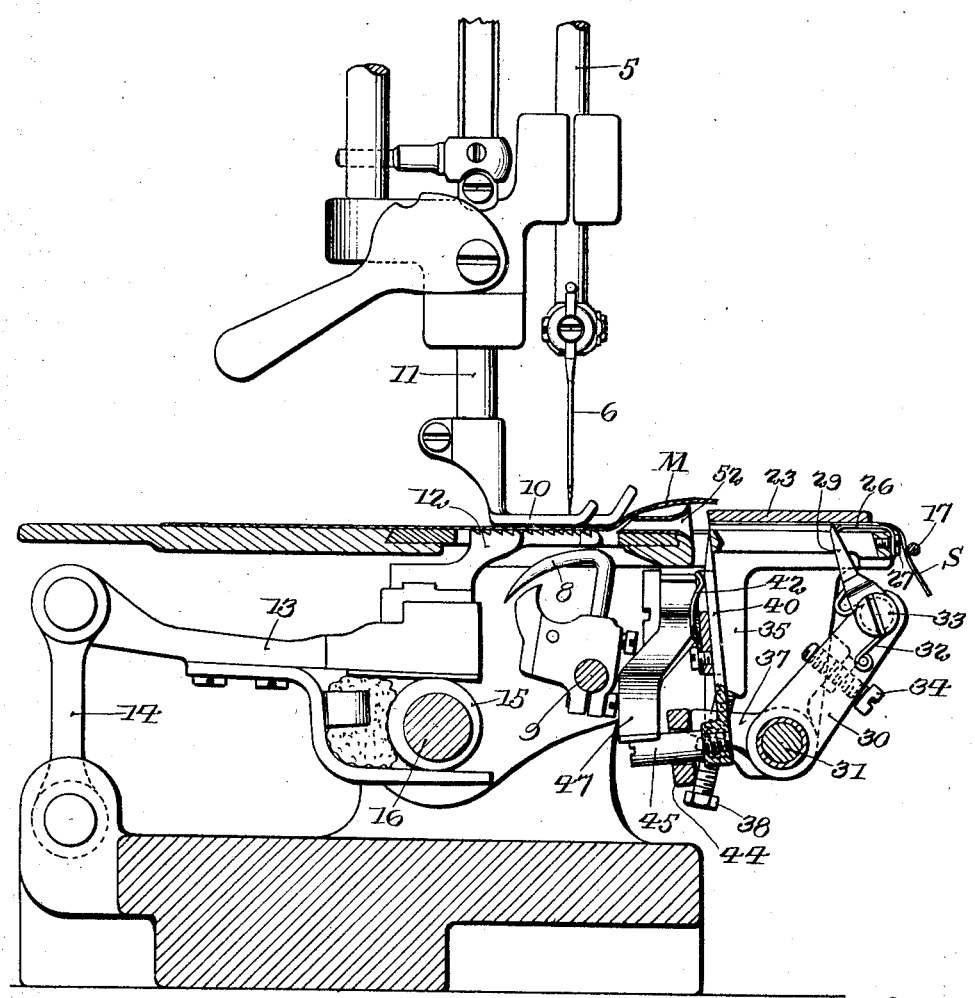
Fig. 7 is a view in vertical section through the machine substantially on the line of feed and showing my improved devices with the free end of the strip at the severing means and the feeding in finger retracted ready to feed the strip forward.

The feeding in finger 29 is pivotally connected to an arm 30 rigidly fixed on a shaft 31. A spring 32 extending around the pivot pin 33 for the finger 29 operates to press the finger up against the strip passing through the recess. The arm 30 is provided with a stop screw 34 which is adapted to make contact with the depending apron 35 of the sewing machine and limit the forward movement of the finger 29. The arm 30 is carried by a sleeve 36. Also carried by this sleeve 36 is a second arm 37 which carries a stop screw 38. The stop screw 38 is adapted to make contact with the lower edge 39 of the apron 35 and thus limit the rearward movement of the finger 29, as clearly shown in Fig. 7 of the drawings.

Coöperating with the stationary ledger blade 23 is a movable cutter blade 40. This movable cutter blade 40 slides in suitable guide-ways on the rear face of the apron 55 and is guided in its movements by a cover plate 41, see Fig. 10. The movable blade is pressed against the ledger blade by a spring 42. Said cutter blade has a coöperating finger 43 which always overlaps the ledger blade and guides the cutter in its movements relative thereto. The cutter is raised and lowered by a lever 44. This lever is provided with a forked end adapted to engage a screw 45 attached to the cutter blade. Said lever is fulcrumed at 46. A spring 47 secured to the cloth plate by a supporting stud 48 bears against this screw 45 and normally forces the cutter blade downwardly. The downward movement of the cutter blade is limited by an adjustable stop 49. The upward movement of the cutter blade is limited by an adjustable stop 50. The lever 44 is depressed at its outer end to raise the cutter to sever the strip by means of a chain or other flexible connection 51.

Directly in front of the sewing mechanism is a guide 52 which is supported by a plate 53 attached by suitable screws 54 to the cloth plate of the machine. Said guide has forwardly projecting fingers 55—55. The plate 53 is cut away at 56. The presser foot extends into this cut away portion and also at its sides extends beyond the fingers 55 so as to properly hold the strip that is being stitched. The receiving end of the guide 52 is tapered and enlarged so as to insure the free end of the strip passing into this guide 52 when it is moved forward by the finger.

Figure 2:
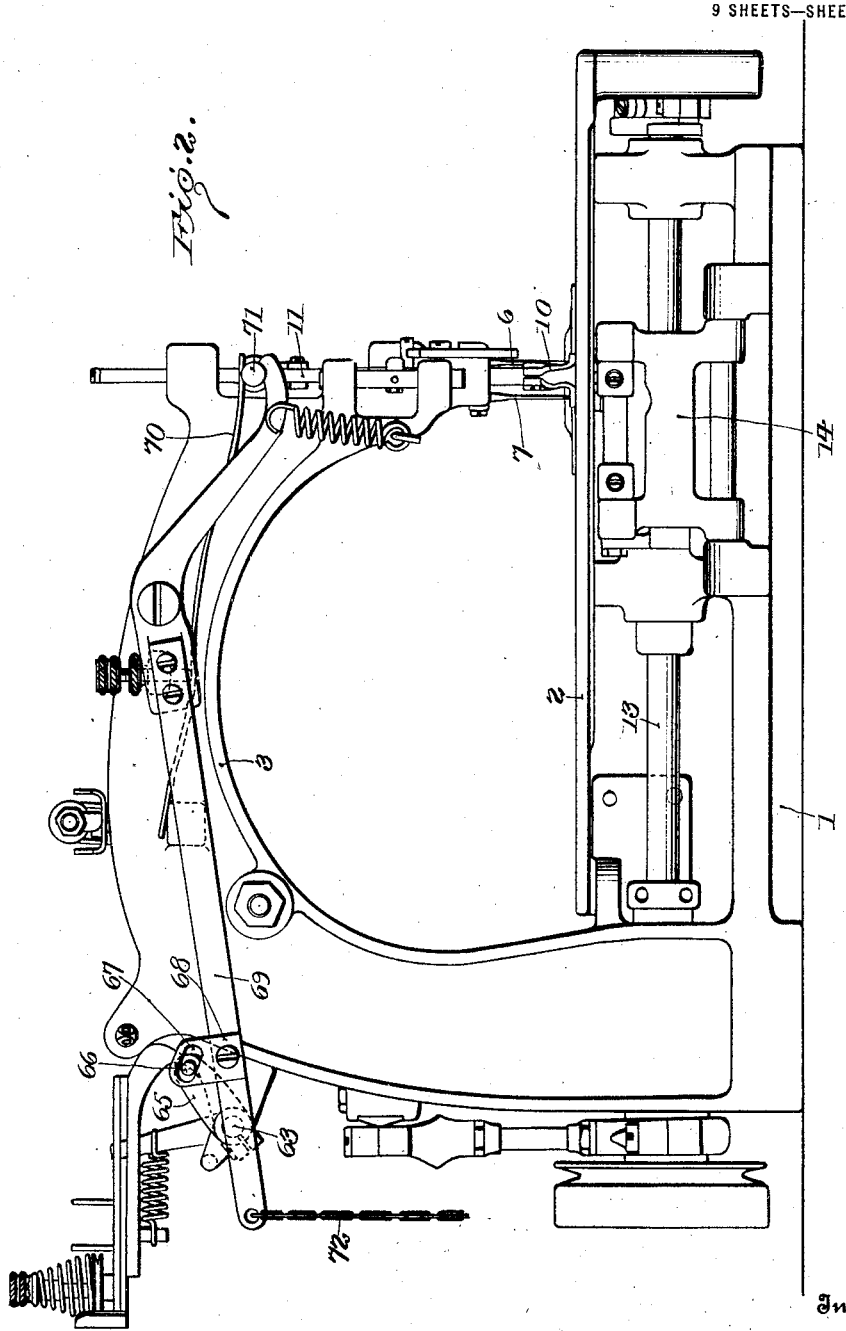
Fig. 2 is a rear view of the same.
Figure 3:
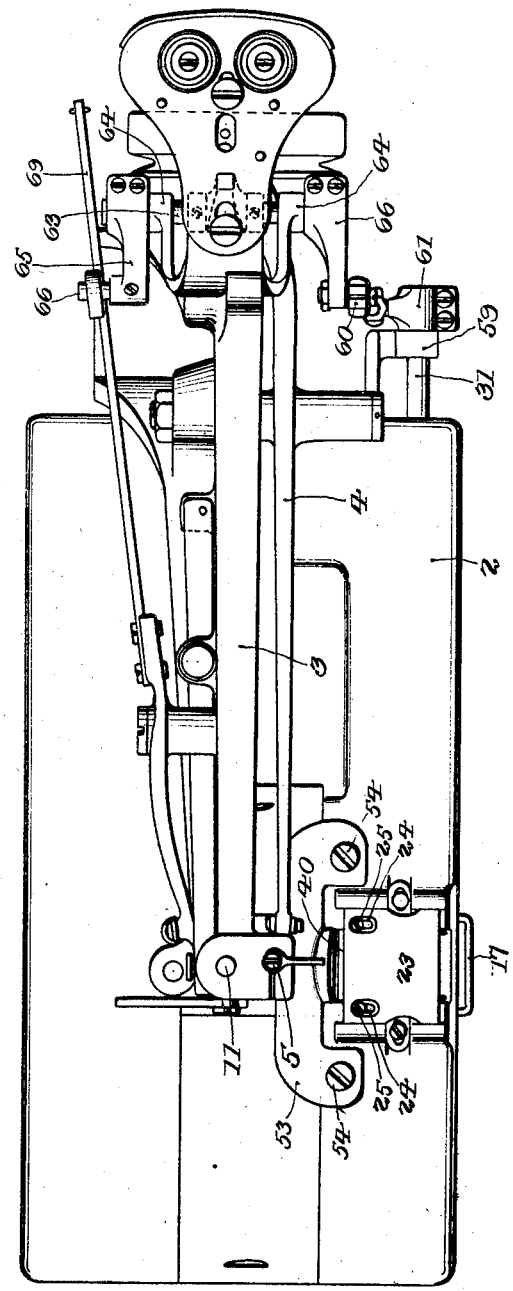
Fig. 3 is a plan view of the machine.

The shaft 31 is mounted in suitable bearings 57, 58 and 59, carried by the cloth plate and this shaft is oscillated by a link 60 which is attached to an arm 61 on the shaft and to an arm 62 on the cross shaft 63. The cross shaft 63 is mounted in bearings 64—64, (see Fig. 3). At the opposite end said shaft is provided with an arm 65 which carries a finger 66 extending into a slot 67 in a bracket 68 attached to the lever 69 used for raising the presser foot, (see Fig. 2 of the drawings). The presser bar is depressed by a spring 70. The lever 69 extends underneath a lug 71 carried by the presser bar. This lever 69 is raised by means of a chain or other flexible connection 72. As clearly shown in Fig. 12 of the drawings, this chain 72 is connected to a lug 73 at the forward end of a treadle 74 which is fulcrumed intermediate its ends on a bracket 75. The chain 51 for operating the cutter is pivoted to a rock arm 76. The rock arm is fulcrumed on a bracket 77 carried by the table T which supports the machine. The other end of the rock arm 76 is connected to a chain 78, which in turn is connected to a second rock arm 79 pivoted at 80 to a bracket 81 carried by the table T. The other end of the rock arm 79 is connected to a chain 82 which in turn is connected to a lug 83 secured to the treadle 74 at the heel end thereof or at the end opposite from the lug 73. It will readily be seen that as the toe end of the treadle 74 is depressed, the chain 72 will be drawn downwardly while the chain 82 will not be disturbed. This operating on the lever 69 raises the presser foot and simultaneously oscillates the cross shaft 63 which, through the link 60 oscillates the shaft 31 and this moves the arm 30, carrying the feeding in finger 29 so as to cause the feeding in finger to move the strip forward, carrying the free end of the strip underneath the presser foot. When the chain 72 is released by a tilting of the treadle in the opposite direction, the presser foot will be lowered and the feeding in finger retracted leaving the strip with its free end under the presser foot. The treadle may be brought back to normal position as shown in Fig. 13, without operating the cutting knife. A depressing of the heel of the treadle from the position shown in this figure will draw down on the chain 82 and this will draw down on the chain 51, operating the lever to raise the cutter to sever the strip. As soon as the treadle comes back again to normal position the cutter is released and drops to normal idle position.

From the above it will be apparent that I have provided means whereby the strip may be severed at the will of the operator and the free end of the remaining portion of the strip fed forward by means which is independent of the severing means. In stitching a label or the like, to a body material, the severing means is preferably set back from the needles substantially a distance equal to the length of the label. Assuming that the end of the strip is at the severing means, the operator pressing on the toe of the treadle raises the presser foot and feeds the strip forward until the free end of the same is brought to the needles. The treadle is then brought back to normal position which causes the feeding in finger to return to its normal idle position, leaving the strip with the free end thereof close to the needle. The operator may then tilt the treadle in the opposite direction which will cause the strip to be severed and a portion of the strip, equal in length to the label cut from the strip. The machine is then operated to stitch the label to the body material. The strip is then again fed forward by the same procedure above described. If it is desired to lengthen the label this may be readily accomplished by feeding the strip forward until it is caught by the presser foot, then starting the machine and stitching a portion of the label to the body fabric, after which the machine may be stopped and the severing mechanism operated to sever the strip.

I am aware that some of the details of construction which I utilize in connection with my improved mechanism are shown and described in the patent to Kershner, 1,169,088, granted January 18th, 1916. The feeding in finger and the severing mechanism of this patent, however, are operated by the same mechanism and the parts are timed so that when the treadle is depressed the strip is severed and when the treadle is released the free end of the strip is moved forward. My device is an improvement upon the mechanism shown in this patent and enables an entirely different operation to be performed. This is brought about through the independent action of the devices without operating the severing mechanism and the feeding in finger.

It is obvious that minor changes in the details of construction and arrangement of parts may be made without departing from the spirit of the invention as set forth in the appended claims.

Having thus described my invention, what

I claim as new and desire to secure by Letters Patent, is—

1. The combination of stitch forming mechanism, a presser foot, a feed dog beneath the presser foot, a severing mechanism located in advance of the presser foot for severing the strip at right angles to its length, means for raising the presser foot, means for advancing the forward end of the strip underneath the presser foot where it will be engaged by the feed dog, and means common to the presser foot lifting means and to the strip advancing means and independent of the severing mechanism for raising the presser foot and advancing the free end of the strip at the will of the operator.

2. The combination of stitch forming mechanism, a presser foot, a feed dog beneath the presser foot, a severing mechanism located in advance of the presser foot for severing the strip at right angles to its length, means for raising the presser foot, means for advancing the forward end of the strip underneath the presser foot where it will be engaged by the feed dog, a treadle, means operated by said treadle for raising the presser foot and advancing the free end of said strip beneath the presser foot, and means operated by the treadle for actuating the severing mechanism, said treadle operated means being constructed so that the severing mechanism may be operated independently of the presser foot raising means and strip advancing means.

3. The combination of a work support, a presser foot, stitch forming mechanism, severing mechanism located in front of the presser foot and adapted to sever a strip at right angles to its length, feeding mechanism for feeding the free remaining end of the strip forward beneath the presser foot and manually operated means independent of the severing mechanism for lifting the presser foot and feeding the strip forward to a point underneath the same, a guide between the severing mechanism and the presser foot for directing the strip beneath the presser foot.

4. The combination of stitch forming mechanism, a severing mechanism located in advance of the stitch forming mechanism and adapted to sever a strip at right angles to its length, a device for feeding the strip forward to the stitching mechanism, a treadle, means for connecting the treadle at one end thereof to the severing mechanism and means for connecting the treadle at the other end thereof to the feeding in device, said means controlled by the treadle being so constructed that a movement of the treadle in one direction will operate the severing mechanism without operating the feeding in device and a movement of the treadle in the other direction will operate the feeding in device without operating the severing mechanism.

5. A sewing machine including in combination, a work support, a presser foot, a lever for raising the presser foot, a feeding in finger for feeding the strip forward beneath the presser foot, a rock shaft for operating said feeding in finger, stops for limiting the movements of the rock shaft and means connected to said presser foot lifting lever for actuating the rock shaft whereby the feeding in finger may be moved forward with the raising of the presser foot so that the end of the strip may be positioned beneath the foot.

6. A sewing machine including in combination, a work support, a presser foot, a lever for raising the presser foot, a feeding in finger for feeding the strip forward beneath the presser foot, a rock shaft for operating said feeding in finger, stops for limiting the movements of the rock shaft, a cross shaft, a link connecting said cross shaft to the shaft for operating the feeding in finger, a bracket carried by the presser foot lifting lever, said bracket having a connection to said cross shaft whereby the depressing of the presser foot lever will raise the presser foot and through the cross shaft will operate the feeding in finger to move the strip forward beneath the presser foot.

7. A sewing machine including in combination, a work support, a presser foot, a lever for raising the presser foot, a feeding in finger for feeding the strip forward beneath the presser foot, a rock shaft for operating said feeding in finger, stops for limiting the movements of the rock shaft and means connected to said presser foot lifting lever for actuating the rock shaft whereby the feeding in finger may be moved forward with the raising of the presser foot so that the end of the strip may be positioned beneath the foot and a severing mechanism located in advance of the presser foot and adapted to sever the strip at right angles to the length of the strip.

8. A sewing machine including in combination, a work support, a presser foot, a lever for raising the presser foot, a feeding in finger for feeding the strip forwardly beneath the presser foot, a rock shaft for operating said feeding in finger, stops for limiting the movements of the rock shaft, and means connected to said presser foot lifting lever for actuating the rock shaft whereby the feeding in finger may be moved forward with the raising of the presser foot so that the end of the strip may be positioned beneath the foot, and a severing mechanism located in advance of the presser foot and adapted to sever the strip at right angles to the length of the strip, and means whereby said severing mechanism may be operated independently of the lifting of the presser foot.

9. A sewing machine including in combination, a work support, a presser foot, a lever for raising the presser foot, a feeding in finger for feeding the strip forward beneath the presser foot, a rock shaft for operating said feeding in finger, stops for limiting the movements of the rock shaft, a cross shaft, a link connecting said cross shaft to the shaft for operating the feeding in finger, a bracket carried by the presser foot lifting lever, said bracket having a connection to said shaft whereby the depressing of the presser foot lever will raise the presser foot and through the cross shaft will operate the feeding in finger to move the strip forward beneath the presser foot, a severing mechanism located in advance of the presser foot for severing a strip at right angles to the length thereof and means for operating said severing mechanism independently of the lifting of the presser foot.

10. A sewing machine including in combination, a work support, a presser foot, a lever for raising the presser foot, a feeding in finger for feeding the strip forward beneath the presser foot, a rock shaft for operating said feeding in finger, stops for limiting the movements of the rock shaft, a cross shaft, a link connecting said cross shaft to the shaft for operating the feeding in finger, a bracket carried by the presser foot lifting lever, said bracket having a connection to said shaft whereby the depressing of the presser foot lever will raise the presser foot and through the cross shaft will operate the feeding in finger to move the strip forward beneath the presser foot, a severing mechanism located in advance of the presser foot for severing a strip at right angles to the length thereof, a treadle, a flexible connection between one end of said treadle and the presser foot lifting lever, a lever for actuating said severing mechanism, and a flexible connection between the other end of said treadle and the lever for actuating the severing mechanism.

In testimony whereof, I affix my signature in the presence of two witnesses.

WALTER W. SCOTT.

Witnesses:
H. A. DUNHAM,
G. A. DUNHAM.